US008923450B2

(12) United States Patent
Mauritz et al.

(10) Patent No.: US 8,923,450 B2
(45) Date of Patent: Dec. 30, 2014

(54) BANK OF CORRELATORS FOR SETS OF GCL SEQUENCES

(75) Inventors: Oskar Mauritz, Shenzhen (CN); Branislav Popovic, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 992 days.

(21) Appl. No.: 12/413,062

(22) Filed: Mar. 27, 2009

(65) Prior Publication Data

US 2009/0285338 A1 Nov. 19, 2009

Related U.S. Application Data

(63) Continuation of application No. PCT/CN2006/003714, filed on Dec. 30, 2006.

(51) Int. Cl.
*H04L 27/06* (2006.01)
*H03D 1/00* (2006.01)

(52) U.S. Cl.
USPC .................. 375/343; 375/296; 375/316

(58) Field of Classification Search
USPC .......................... 375/343, 296, 316
See application file for complete search history.

(56) References Cited

U.S. PATENT DOCUMENTS

| 2005/0226140 | A1 | 10/2005 | Zhuang et al. | |
| 2006/0039451 | A1 | 2/2006 | Zhuang et al. | |
| 2007/0140106 | A1* | 6/2007 | Tsai et al. | 370/208 |
| 2007/0183386 | A1* | 8/2007 | Muharemovic et al. | 370/344 |
| 2008/0107086 | A1* | 5/2008 | Fukuta et al. | 370/335 |

FOREIGN PATENT DOCUMENTS

CN 101390355 A 3/2009
WO WO2005/104412 A1 11/2005

OTHER PUBLICATIONS

3GPP TS 25.211: "Physical channels and mapping of transport channels onto physical channels (FDD)," V7.0.0 (Mar. 2006).*
3GPP TS 25.214: "Technical Specification Group Radio Access Network; Physical layer procedures (FDD)," V7.3.0 (Dec. 2006).*
3GPP TS 36.211: "Technical Specification Group Radio Access Network; Physical Channels and Modulation," V0.2.1 (Nov. 2006).*
English translation of the Written Opinion of the International Searching Authority for International application No. PCT/CN2006/003714, mailed Oct. 18, 2007, 3 pgs.
Popovic, Branislav M., et al. "Generalized Chirp-Like Polyphase Sequences with Optimum Correlation Properties" IEEE Transactions on Information Theory, vol. 38, No. 4, Jul. 1992, 4 pgs.
Popovic, Branislav M.,"Efficient Matched Filter for the Generalized Shirp-Like Polyphase Sequences" IEEE Transactions on Aerospace and Electronic Systems, vol. 30, No. 3, Jul. 1992, 9 pgs.

\* cited by examiner

*Primary Examiner* — Shuwang Liu
*Assistant Examiner* — Nader Bolourchi
(74) *Attorney, Agent, or Firm* — Staas & Halsey LLP (57) ABSTRACT

A method for correlation of an input signal in a receiver is disclosed as well as a receiver and a communication system for implementing the method. The input signal is correlated with Generalized Chirp-Like (GCL) sequences being derived from a single Zadoff-Chu sequence modulated with at least two modulation sequences. The method includes at least the steps of processing samples of the input signal in a first delay line, in a Discrete Fourier Transform (DFT) circuit and in a second delay line. According to the invention, a multiplication of samples of the input signal with elements of modulation sequences corresponding to the at least two modulation sequences being used for deriving the GCL sequences is performed in a step after the processing in the first delay line. Then a DFT processing is performed using a DFT circuit.

25 Claims, 4 Drawing Sheets

BANK OF CORRELATORS FOR SETS OF GCL SEQUENCES

CROSS-REFERENCE TO RELATED APPLICATION

This application is a continuation of International Application No. PCT/CN2006/003714, filed on Dec. 30, 2006, titled "Efficient Bank of Correlators for Sets of GCL Sequences," the entire contents of which are incorporated herein by reference.

FIELD OF THE TECHNOLOGY

The present invention relates to communication technologies, and in particular, to a method, receiver, and communication system for correlation of an input signal with Generalized Chirp-Like (GCL) sequences.

BACKGROUND

In most mobile communication systems of today, there are specific requirements regarding cell search and synchronization of a radio base station and a mobile terminal in order to secure a correct data transmission. One example of such a system is the Universal Terrestrial Radio Access Network (UTRAN). There are also a number of other such mobile communication systems that have corresponding needs regarding cell search and synchronization.

In such mobile communication systems, synchronization is often performed both in uplink and downlink. In one step of the synchronization, e.g., downlink synchronization, the mobile terminal synchronizes to the carrier frequency and the frame timing of the radio base station. This synchronization, however, is not sufficient to ensure that the radio base station can properly receive the signals from the mobile terminals, since the mobile terminals may be located at various distances relative to the radio base station.

Consequently, further synchronization, e.g., uplink synchronization, is needed since the distance between a radio base station and a mobile terminal, and hence the round trip time, is in general unknown.

For uplink synchronization of the mobile terminals, a random access channel (RACH) can be used. RACH is in some systems contention-based, which means any mobile terminal within the cell may transmit on the resource allocated to RACH. Consequently, several mobile terminals may attempt to transmit synchronization signals simultaneously. In order to reduce the risk that the radio base station fails to distinguish signals from different mobile terminals, a set of random access preamble sequences is provided, a set being two or more preamble sequences, wherein each mobile terminal randomly selects one such random access preamble sequence. The random access preamble sequences selected by each mobile terminal can then be uniquely distinguished by the radio base station.

In a cell search situation, it could also be possible for a mobile terminal to choose one of a number of different preambles to send to a radio base station. The choice of one of these preambles, made by the mobile terminal, could in this case then also convey some information to the radio base station, e.g. telling the radio base station which services the mobile terminal requests.

Successful detection of the random access preamble sequence is necessary for the mobile terminal to access the network. It is therefore important that the transmitted random access preamble sequence requires a low power amplifier back-off to allow for high average transmit power and hence a good coverage.

The random access preamble sequences in the uplink should preferably have the following properties:
good autocorrelation properties to allow for an accurate timing estimation,
good cross-correlation properties to allow for an accurate timing estimation of different simultaneous and partially synchronized (i.e. downlink synchronized) preamble sequences, wherein the phase difference is limited by the maximum round-trip time in the cell, and
zero cross-correlation for synchronous and simultaneous preamble sequences.

These properties are satisfied by the use of Zero-Correlation Zone (ZCZ) sequences. ZCZ sequences should thus preferably be used for the preamble sequences used in cell search and synchronization. ZCZ sequences can be derived from Generalized Chirp-Like (GCL) sequences, which are described in the following.

Generalized chirp-like (GCL) sequences belong to the family of Constant Amplitude Zero AutoCorrelation (CAZAC) sequences. The CAZAC sequences have ideal periodic autocorrelation and close to ideal aperiodic autocorrelation. Zero periodic autocorrelation in at least a zone around zero delay is an important property of a transmitted sequence to enable an accurate time-of-arrival estimation. Furthermore, the CAZAC sequences have a constant amplitude. A band-limited signal obtained by pulse-shaping of a CAZAC sequence will have small power variations, thus allowing for the use of low-cost power amplifiers and high efficiency.

GCL sequences are modulated Zadoff-Chu sequences, see further reference B. M. Popovic, "Generalized Chirp-Like Polyphase Sequences with Optimum Correlation Properties," IEEE Trans. on Information Theory, Vol. 38, no. 4, pp 1406-1409, July 1992 (hereinafter "Popovic I").

A GCL sequence $\{c(k)\}$ is defined as $$c(k)=a(k)b(k \bmod m), k=0, 1, \ldots, N-1, \qquad (1)$$

where $N=sm^2$, s and m are positive integers, $\{b(k)\}$ is any sequence of m complex numbers of unit magnitude, and $\{a(k)\}$ is the Zadoff-Chu sequence $$a(k) = \begin{cases} W_N^{k^2/2+qk}, & N \text{ even} \\ W_N^{k(k+1)/2+qk}, & N \text{ odd,} \end{cases} \qquad (2)$$

$k = 0, 1, \ldots, N-1$, $q$ is an integer, where $W_N=\exp(-j2\pi r/N)$ and r is relatively prime to N. $W_n^p$ is a shorthand notation for $\exp(-j2\pi rp/n)$.

If two GCL sequences $c_x(k)$ and $c_y(k)$ are defined by using the same Zadoff-Chu sequence $\{a(k)\}$ but different arbitrary orthogonal modulation sequences $\{b_x(k)\}$ and $\{b_y(k)\}$, they are so-called zero-correlation zone (ZCZ) sequences, i.e. the periodic cross-correlations are zero for all shifts p such that $0 \leq |p| \leq T$, where $T=sm-1$ is the length of the zero correlation zone. The aperiodic cross-correlations are in general low for shifts within the zero-correlation zone. The low cross-correlation property allows for detection of several quasi-simultaneous transmissions of different GCL sequences based on the same Zadoff-Chu sequence, even when the received signal powers are very different.

From the autocorrelation and cross-correlation properties as well as the limited power variations, a set of orthogonal GCL sequences using the same Zadoff-Chu sequence is therefore useful for non-synchronized random access preambles.

A detector, in, for instance, a radio base station transceiver, for non-synchronized random access preambles based on such a set of GCL sequences needs to correlate the received signal with all sequences in the set of GCL sequences for a range of delays. Such correlations are computationally complex.

SUMMARY

Embodiments of the present disclosure provide a method and a receiver that reduce the complexity of correlation of an input signal when a set of GCL sequences are used for preambles or the like.

The complexity of the correlation dramatically grows when more than one GCL sequence is used. Embodiments of the present disclosure therefore aim to provide a correlation method and a receiver implementing the method having less complexity than the correlation methods and receivers known in the art.

An method for correlation of an input signal in a receiver with Generalized Chirp-Like (GCL) sequences being derived from a single Zadoff-Chu sequence modulated with at least two modulation sequences is provided. The method includes:

processing samples of the input signal in a first delay line, in a Discrete Fourier Transform (DFT) circuit, and in a second delay line;

performing, in a step after the processing in said first delay line, a multiplication of samples of the input signal with elements of modulation sequences corresponding to the at least two modulation sequences being used for deriving the GCL sequences; and performing the DFT processing using a DFT circuit.

An receiver arranged for correlation of an input signal with Generalized Chirp-Like (GCL) sequences being derived from a single Zadoff-Chu sequence modulated with at least two modulation sequences is provided. The receiver includes at least stages for first delay line processing, Discrete Fourier Transform (DFT) processing and second delay line processing. The receiver further includes: means for performing, in a stage after the stage for first delay line processing, a multiplication of samples of the input signal with elements of modulation sequences corresponding to the at least two modulation sequences being used for deriving said GCL sequences; and means for performing the DFT processing in a DFT circuit.

A communication system is also provided. The communication system has communication resources for communication between a first transceiver and a second transceiver, at least one of the first and second transceivers including a receiver arranged for correlation of an input signal with Generalized Chirp-Like (GCL) sequences being derived from a single Zadoff-Chu sequence modulated with at least two modulation sequences, the receiver including at least stages for first delay line processing, Discrete Fourier Transform (DFT) processing and second delay line processing, the receiver further including: means for performing, in a stage after the stage for first delay line processing, a multiplication of samples of the input signal with elements of modulation sequences corresponding to the at least two modulation sequences being used for deriving the GCL sequences; and means for performing the DFT processing in a DFT circuit.

Detailed exemplary embodiments and advantages of the method, receiver and communication system according to the disclosure will now be described with reference to the appended drawings illustrating some embodiments.

DETAILED DESCRIPTION

A conventional implementation of an efficient matched filter for a single GCL sequence has been presented in reference B. M. Popovic, "Efficient matched filter for the Generalized Chirp-Like polyphase sequences," *IEEE Trans. on Aerospace and Electronic Systems*, Vol. 30, no. 3, pp 769-777, July 1994 hereinafter "Popovic II". This solution thus only relates to reception of one GCL sequence.

The implementation in reference Popovic II is based on an appropriate decomposition of the Zadoff-Chu sequence.

Let $k = smi+d, k=0, 1, \ldots, N-1, N=sm^2,$ $i = 0, 1, \ldots, m-1,$ $d = 0, 1, \ldots, sm-1.$ (3)

Then $$a_{i,d} = \begin{cases} (-1)^{si} W_m^{qi} W_m^{id} W_N^{d^2/2+qd}, & N \text{ even} \\ (-1)^{rsi} W_m^{(q+1/2)i} W_m^{id} W_N^{d^2/2+(q+1/2)d}, & N \text{ odd}, \end{cases}$$ (4)

where we have used $(-1)^{si^2} = (-1)^{si}$. The filter matched to $c(k)$ is equivalent to a correlator that acts on an input signal $u(k)$.

The output z is given by $$z(n) = \sum_{k=0}^{N-1} c(k) * u(n - N + 1 + k).$$ (5)

Using equations (2), (3), and (4) in equation (5) gives $$z(n) = \sum_{i=0}^{m-1} f(i) \sum_{d=0}^{sm-1} u(n - N + 1 + smi + d) g(d) b(d \bmod m) * W_m^{-id},$$ (6)

where $$f(i) = \begin{cases} (-1)^{si} W_m^{-qi}, & N \text{ even} \\ (-1)^{rsi} W_m^{-(q+1/2)i}, & N \text{ odd}, \end{cases} \quad (7)$$

and $$g(d) = \begin{cases} W^{-d^2/2-qd}, & N \text{ even} \\ W_N^{-d^2/2-(q+1/2)d}, & N \text{ odd}. \end{cases} \quad (8)$$

Another change of variables $$d=mx+y, d=0, 1, \ldots, sm-1$$

$$x=0, 1, \ldots, s-1,$$

$$y=0, 1, \ldots, m-1 \quad (9)$$

in equation (6) and setting n'=n−N+1 gives $$z(n) = \sum_{i=0}^{m-1} f(i) \sum_{x=0}^{s-1} \sum_{y=0}^{m-1} u(n' + smi + mx + y) g(mx + y) b(y) * W_m^{-iy}. \quad (10)$$

The last summation in equation (10) represents the ith frequency of the m-point discrete Fourier transform (DFT) of the (si+x)th block of m windowed input samples. Denote the ith frequency of the m-point DFT of the windowed (si+x)th block by $S_{i,x}(i)$. Then equation (10) can be expressed as $$z(n) = \sum_{i=0}^{m-1} f(i) \sum_{x=0}^{s-1} S_{i,x}(i). \quad (11)$$

Hence, z(n) is a weighted sum of DFT outputs where the DFTs are performed on sm different windowed blocks of the input signal. In equation (11) the jth frequency of the DFT of the windowed (sj)th block is multiplied by f(j). In the expression for a later output z(n+smj) the 0th frequency of the DFT of the same windowed block is multiplied by f(0). This property suggests that one can calculate all m frequencies of a single windowed block, multiply the jth frequency output by f(j) and delay it by sm(j−1) samples. Calculating all m frequencies of the DFT simultaneously can be done efficiently using a Fast Fourier transform (FFT).

Figure 1:
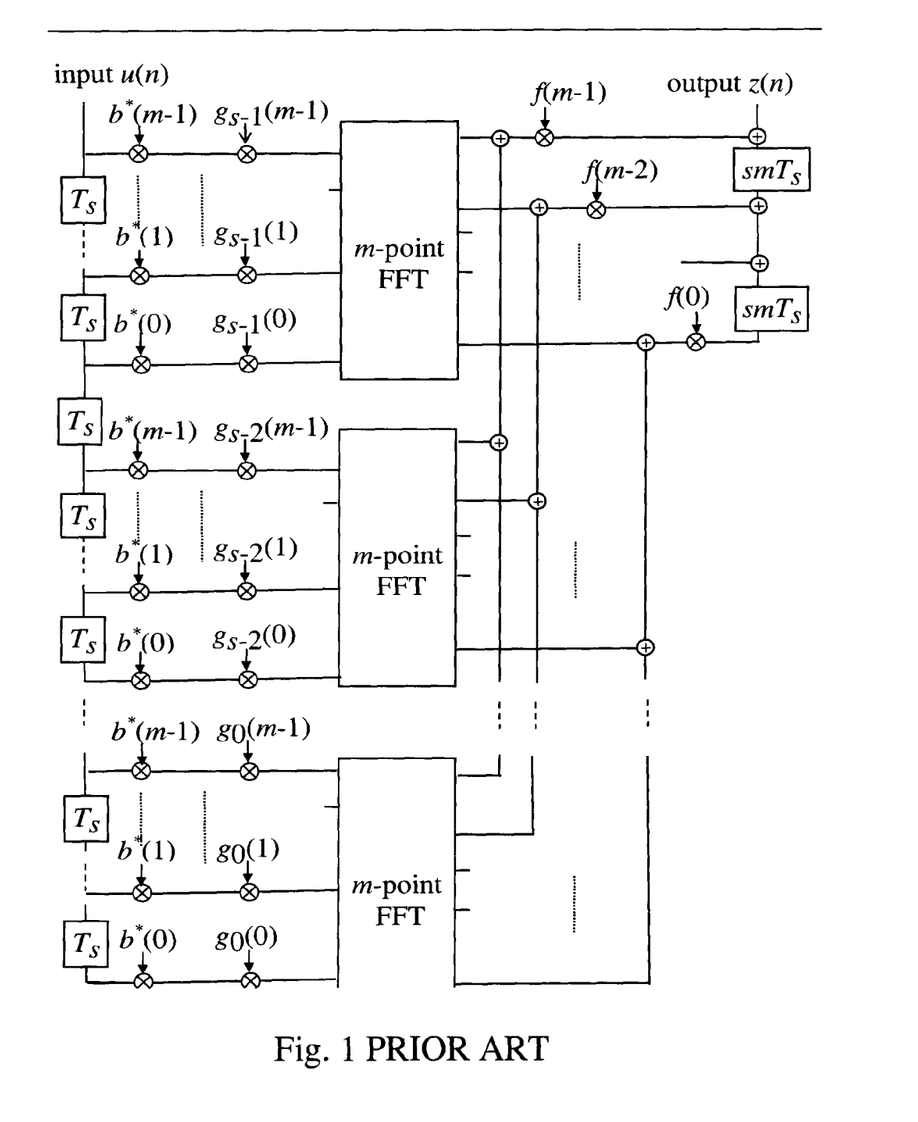
FIG. 1 shows a conventional correlator, used for a single GCL sequence.

The efficient correlator implementing the matched filter from reference Popovic II is shown in FIG. 1, with the notation $g_x(y)=g(mx+y)$.

The hardware complexity of a correlator can be defined as the number of required complex multiplications and additions per input sample. For a conventional correlator there are N multiplications and N−1 additions per input sample, giving a hardware complexity O of $$O=2N-1.$$

The number of multiplications M required for the correlator in FIG. 1 is given by $M=sm+m-1+sM_{DFT}$ and the number of additions A is $A=sm-1+sA_{DFT}$, given that the factors g(mx+y) are pre-multiplied by b(y). The term "−1" in the number of multiplications is here due to the fact that f(0) is always equal to 1.

The hardware complexity of this correlator depends mainly on the DFT algorithms. FFTs can be devised for all sizes of DFTs. If m is a power of 2, the DFT can be very efficiently implemented by a radix-2 FFT with $$M_{DFT} = \frac{m}{2} \log_2 m$$

and $A_{DFT}=m \log_2 m$. This instead gives a hardware complexity of $$O=1.5sm \log_2 m+(2s+1)m-2. \quad (12)$$

The hardware complexity can thus be lowered for a single GCL sequence correlator by the use of FFTs instead of DFTs when implementing the correlator.

However, the complexity of the correlation dramatically grows when more than one GCL sequence is used. A detector, in for instance a radio base station transceiver, then needs to correlate the received signal with all sequences in the used set of GCL sequences. More computations must then be made in the matched filters of the receivers in systems in which, for example, a number of different preamble sequences are used. In receivers receiving such signals, complexity is a problem and complexity reduction is thus especially important.

Lower complexity is desired since lower complexity results in less circuitry, less processor computations and less power consumption in the receiver. Since receivers in communication systems generally have limited circuitry space, processing abilities and power resources, these properties are highly desirable.

When expanding the conventional matched filtering shown in reference Popovic II from receiving one single GCL sequence to being able to receive a set of sequences containing more than one GCL sequence, a straightforward solution based on the background art could be to apply the efficient correlator for a single GCL sequence to each sequence in the set separately.

However, the complexity grows linearly with the number of sequences in the set. For m sequences the complexity is $$O = 1.5sm^2 \log_2 m + (2s+1)m^2 - 2m \quad (13)$$
$$= (3 + 1.5 \log_2 m) N + m^2 - 2m.$$

This solution has a high level of complexity.

Another possible solution could be to, for each delay, multiply the received signal element-wise with the complex conjugate of the Zadoff-Chu sequence a(k) to create a vector of length N. Then for k=0, 1, . . . , m−1, every mth element (k+jm, j=0, 1, . . . , sm−1) of the resulting vector is summed. The result is a vector of length m. Finally, if the modulating sequences are DFT sequences, an m-point DFT gives the receiver output for all preambles derived from the same Zadoff-Chu sequence. The resulting number of multiplications for m being a power of 2 is $$M = N + \frac{m}{2} \log_2 m$$

and $A=N-1+m \log_2 m$, which gives a hardware complexity of $$O=2N+1.5m \log_2 m-1. \quad (14)$$

This solution has less complexity than the complexity of the separate efficient correlators shown in equation (13).

Equations (13) and (14) show complexity of two straightforward solutions for reception of more than one GCL sequence when having methods known from background art as a starting point and expanding them to multiple sets of GCL sequences. However, the level of complexity in these solutions is still fairly high and there is a need for further complexity reduction.

Figure 2:
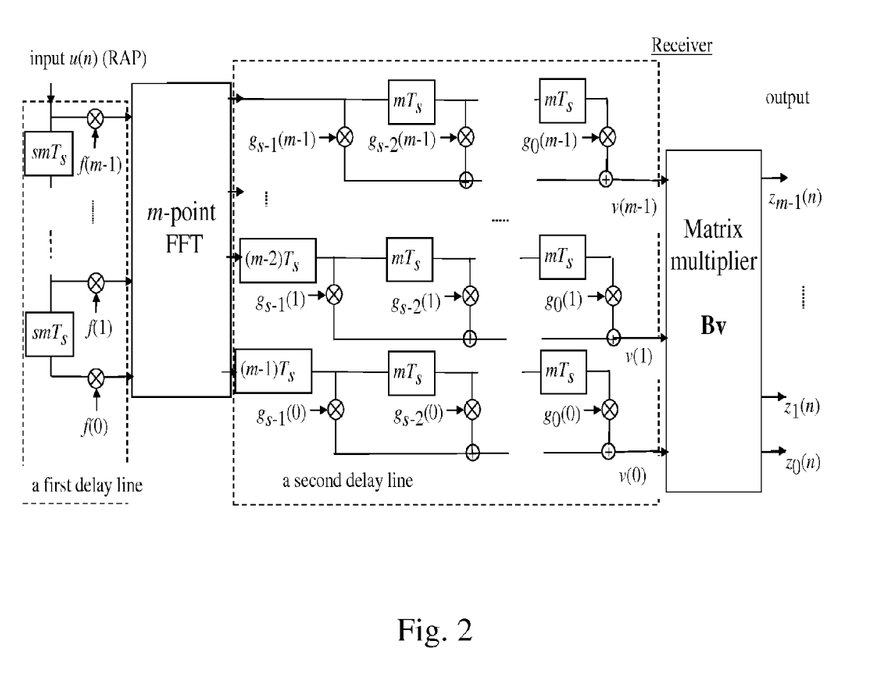
FIG. 2 shows a correlator according to an embodiment of the present disclosure, used for an arbitrary set of modulating sequences.

In FIG. 2, a receiver implementing an embodiment of the present invention, being applicable to any set of modulating sequences, is shown. An incoming signal can possibly include at least one GCL sequence out of a set of GCL sequences generated by modulating a single Zadoff-Chu sequence with different modulating sequences $b_l(k)$. According to this embodiment of the present invention, the receiver therefore receives the incoming signal by correlating it with the GCL sequences in that set of GCL sequences. A receiver according to this embodiment of the invention separates the correlation into four stages. A first stage includes a first delay line, generating m samples for each delay of the correlation. A second stage includes, regardless the number of modulating sequences, a single DFT-circuit, into which the m samples generated by the first stage are fed. The second stage may also be implemented using a single m-point FFT circuit for more effective processing. A third stage includes second delay lines further processing the output of the DFT or FFT and feeds a fourth multiplication stage with samples. The fourth stage performs multiplication of samples of the received signal with elements of the modulation sequences used for creating the GCL sequences at the transmitter end, thereby generating one output sample for each GCL sequence correlator.

In the receiver in FIG. 2, every smth sample of the input signal is in the first delay line stage multiplied by one of the coefficients f to generate the inputs to the DFT. The m samples outputted from the DFT are, in the second delay line stage, further fed to m filters, each filter having coefficients from the sequence g, to produce a vector v of length m with elements $v(y)$, $y=0, 1, \ldots, m-1$. The vector v is independent of the modulating sequences and can therefore be calculated once for all GCL sequences. Finally, the column vector v is, in the multiplication stage subject to a matrix multiplication, Bv, where each row of the matrix B is the complex conjugate of a modulating sequence, i.e. $(B)_{lk}=b_l(k)^*$.

Mathematically described, the inventors of the present invention have realized that a new bank of correlators can be obtained from background art equation (10) by changing the order of summation in the following way:

$$z_l(n) = \sum_{y=0}^{m-1} b_l(y) * \sum_{x=0}^{s-1} g(mx+y) \sum_{i=0}^{m-1} u(n' + smi + mx + y) f(i) W_m^{-iy}, \quad (15)$$

where l is the label of the modulating sequence.

Compared to equation (10), the complex conjugate of the elements $b_l(y)$ from the modulation sequence appears in equation (15) in the leftmost summation instead of in the rightmost summation.

Vector elements $v(y)$ are the result of the two inner summations (the two rightmost summations) and are independent of the modulating sequences. The vector v can thus be calculated once for all GCL sequences derived from a single Zadoff-Chu sequence. Hence, equation (15) can be expressed as $$z_l(n) = \sum_{y=0}^{m-1} b_l(y) * v(y), \quad (16)$$

and the vector of correlator outputs z with elements $z_l(n)$, this equals in matrix notation $$z = Bv.$$

According to this embodiment of the present invention, only one DFT is used, regardless of the number of modulation sequences used. Further, calculations in equation (10) related to the set of modulation sequences are in equations (15) and (16) separated from the rest of the calculations. This separation makes the calculations not related to the set of modulation sequences more effective, since they can be calculated once for all modulation sequences. A complexity reduction is thereby achieved for receivers receiving signals including any of a set of different modulation sequences, i.e. receiving signals including any of a set of GCL sequences.

The complexity reduction of embodiments of the present invention can also be understood from studying FIGS. 1 and 2. As can be seen in the background art solution for a single GCL sequence in FIG. 1, multiplication of input signal samples with modulation sequence elements is performed in the first stage of the receiver. That is all processing in the correlator after this multiplication is dependent of the modulation sequence b. From this follows that, if this structure was used for a set of GCL sequences, the whole correlator shown in FIG. 1 would have to be duplicated once for each GCL sequence. It is easy to realize that this would result in an enormous complexity when the number of GCL sequences increases.

As can be seen in FIG. 2, on the other hand, multiplication of input signal samples with modulation sequence elements is, according to embodiments of the present invention, performed in the last stage of the receiver. The preceding stages of the receiver is thus independent of the set of modulation sequences b and can be calculated once for all modulation sequences, regardless of the number of modulation sequences. Thus, the solution to perform the modulation multiplication in a stage later than the first stage of the receiver reduces the complexity of the receiver when dealing with sets of GCL sequences.

The complexity of the embodiment of the present invention shown in FIG. 2 can also be calculated by estimating the number of complex multiplications and additions. The number of complex multiplications is $M=sm+m-1+M_{DFT}+M_B$ and the number of additions is $A=(s-1)m+A_{DFT}+A_B$, where $M_B$ and $A_B$ are the number of multiplications and additions of the matrix multiplication, respectively.

One interesting case is when B is the DFT matrix, i.e. when a set of modulating sequences are defined as DFT sequences, $b_l(k)=W_m^{lk}$, $l=0, 1, \ldots, m-1$. Then $$M=sm+m-1+2M_{DFT}, \text{ and}$$

$$A=(s-1)m+2A_{DFT}$$

If m is a power of 2, the resulting hardware complexity using radix-2 FFTs is $$O=3m \log_2 m + 2sm - 1. \quad (17)$$

The complexities of background art given by equation (14) and of this embodiment of the invention, defined in equation (17), are given in Table 1. The embodiment of the invention is less complex than background art solutions for all values of m and s. (Variables N, m and s are here the variables used in equations (1) and (2).) The reduction in complexity further increases dramatically with increasing s.

TABLE 1

Hardware complexity of background art and an embodiment of the invention for sets of sequences

| m | s | N | O, backgr. art; eq. (14) | O, invention eq. (17) |
|---|---|---|---|---|
| 4 | 1 | 16 | 43 | 31 |
| 4 | 2 | 32 | 75 | 39 |
| 8 | 1 | 64 | 99 | 87 |
| 8 | 2 | 128 | 163 | 103 |
| 8 | 3 | 192 | 419 | 119 |
| 8 | 7 | 448 | 931 | 183 |

An embodiment of the invention is also less complex than background art solutions for correlation with a single GCL sequence. For a single sequence the g factors can be pre-multiplied with the modulating sequence b so that $A_B = M_B = 0$.

Then $M = sm + m - 1 + M_{DFT}$, and $A = sm - m + A_{DFT}$, and for m power of 2, the hardware complexity O equals $$O = 1.5 \log_2 m + 2sm - 1. \quad (18)$$

The complexity of prior art equation (12) is compared to that of the embodiment of the invention equation (18) for a single sequence in Table 2. The embodiment of the invention reduces the complexity for all values of s and m, in particular as s increases.

TABLE 2

Hardware complexity of background art and an embodiment of the invention for single sequence

| m | s | N | O, backgr. art; eq. (12) | O, invention eq. (18) |
|---|---|---|---|---|
| 4 | 1 | 16 | 22 | 19 |
| 4 | 2 | 32 | 42 | 27 |
| 8 | 1 | 64 | 58 | 51 |
| 8 | 2 | 128 | 110 | 67 |
| 8 | 3 | 192 | 162 | 83 |
| 8 | 7 | 448 | 370 | 147 |

Figure 3:
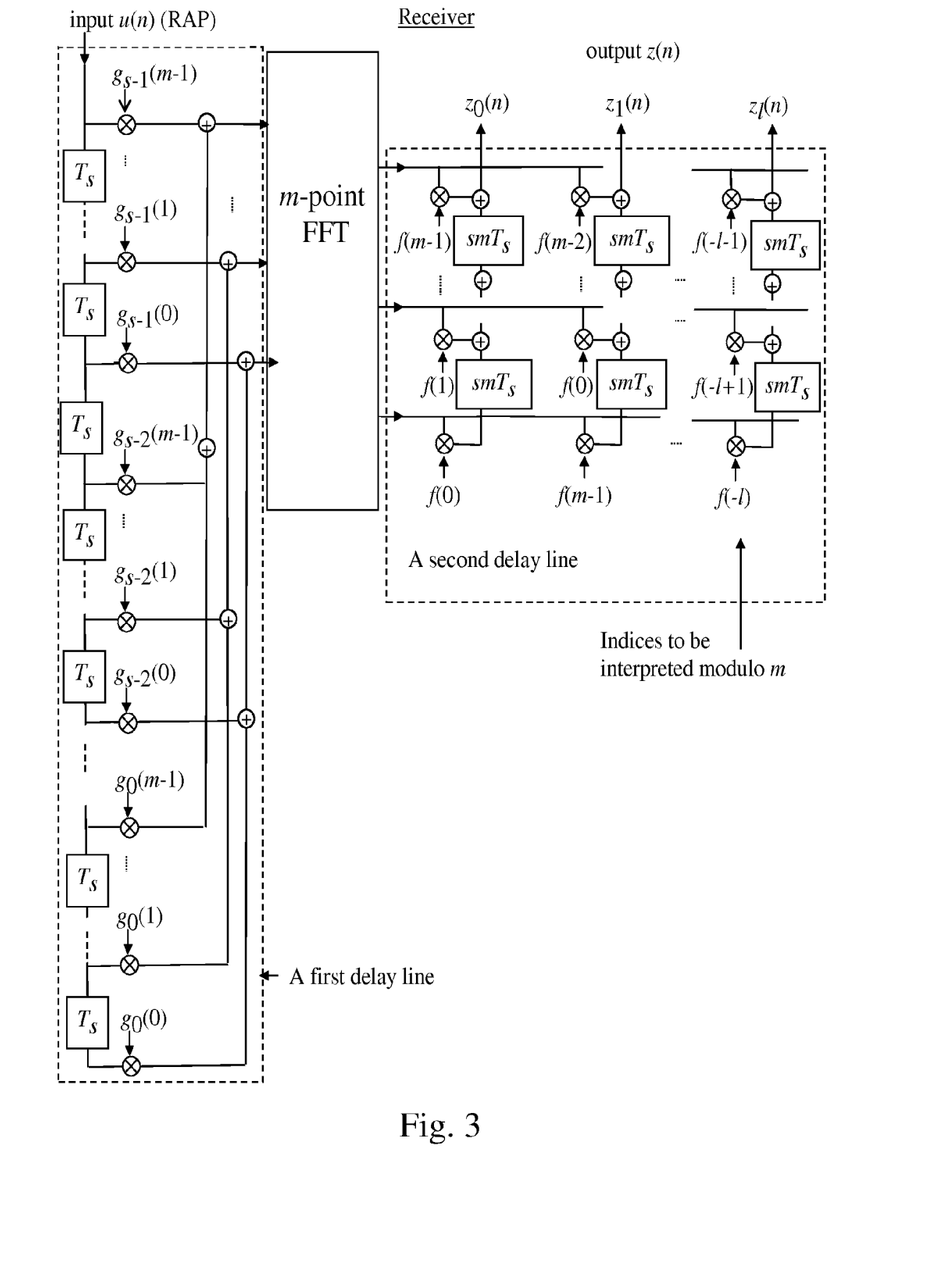
FIG. 3 shows a correlator according to an embodiment of the present disclosure, used for a set of modulating sequences being DFT sequences.
Figure 4:
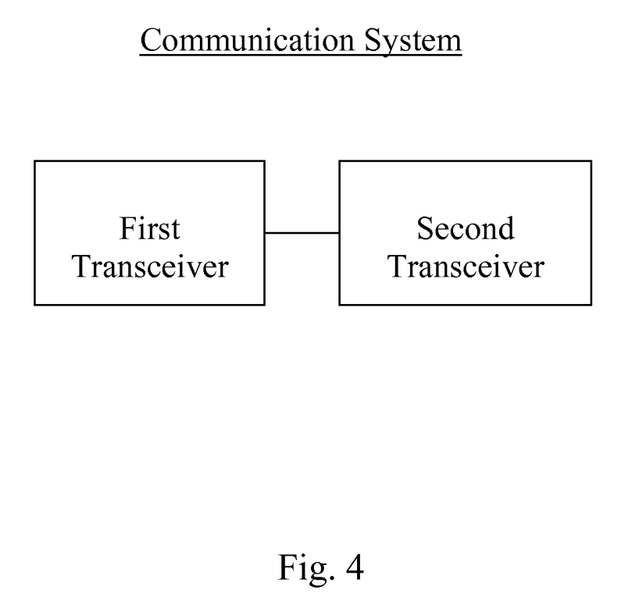
FIG. 4 shows a communication system according to an embodiment of the present disclosure, including a first transceiver in communication with a second transceiver.

In FIG. 3, another embodiment of the present invention, applicable in case where a set of modulating sequences are defined as DFT sequences, $b_l(k) = W_m^{lk}, l = 0, 1, \ldots, m-1$, is shown.

A correlator according to this embodiment of the invention has three stages, a first delay line stage, a DFT stage and a second delay line stage. The first delay line stage includes a delay line including sm delays, sm means for multiplication of samples of said input signal with first delay line coefficients g and means for adding sm first delay line outputs together forming m output samples. The DFT stage includes a single DFT circuit. The DFT stage may also be implemented using an m-point FFT circuit for more effective processing. The DFT stage receives m samples from the first delay line stage and performs multiplication of samples of the received signal with elements of the set of modulation sequences.

The multiplication of the received signal samples with the modulation signal elements can here be performed in the DFT stage since the set of modulation sequences are DFT sequences. The DFT stage outputs m parallel samples of the processed signal. The second delay line stage includes m parallel delay lines each including delays and means for multiplication of the input signal with second delay line coefficients f. The second delay line stage essentially delays and multiplies each output sample from the DFT circuit with second delay line coefficients in a way that all parallel DFT output samples are multiplied with different coefficients f and that these coefficients f are shifted in each delay step of each delay line. The second delay line further adds results of these multiplications in each delay line together and outputs l samples in parallel as an output signal.

Mathematically, the correlation output of the lth sequence, $z_l(n)$, in the correlator shown in FIG. 3 is given by $$z_l(n) = \sum_{i=0}^{m-1} f(i) \sum_{y=0}^{m-1} W_m^{-(i+l)y} \sum_{x=0}^{s-1} u(n' + smi + mx + y) g(mx + y), \quad (19)$$

i.e., the output i+l from the DFT is multiplied by f(i).

According to this embodiment of the present invention, only one DFT is used, regardless of the number of modulation sequences used. Further, calculations in equation (10) related to the set of modulation sequences, here being DFT sequences $b_l(k) = W_m^{lk}, l = 0, 1, \ldots, m-1$, have in equation (19) been moved from the rightmost summation in equation (10) to the DFT summation. This makes calculations related to multiplication of modulation sequences more effective, since they can be made within the already present DFT processing. A complexity reduction is thereby achieved for receivers according to this embodiment, receiving signals including any of a set of different DFT modulation sequences, i.e. receiving signals including any of a set of DFT GCL sequences.

The number of complex multiplications for this embodiment is $M = sm + M_{DFT} + m(m-1)$, since $f(0) = 1$, and the number of additions is $A = (s-1)m + A_{DFT} + m(m-1)$.

If m is a power of 2, the resulting hardware complexity using radix-2 FFTs is $$O = 1.5m \log_2 m + 2sm + 2m^2 - 3m. \quad (20)$$

The complexities of background art given by equation (14) and of this embodiment of the invention, defined in equation (20), are presented in Table 3. This embodiment is less complex than background art solutions for most values of N, m and s, especially for large values of s. (Variables N, m and s are the variables used in equations (1) and (2).)

TABLE 3

Hardware complexity of background art and an embodiment of the invention for sets of sequences

| m | s | N | O, backgr. art eq. (14) | O, invention eq. (20) |
|---|---|---|---|---|
| 4 | 1 | 16 | 43 | 40 |
| 4 | 2 | 32 | 75 | 48 |
| 8 | 1 | 64 | 99 | 156 |
| 8 | 2 | 128 | 163 | 172 |
| 8 | 3 | 192 | 419 | 188 |
| 8 | 7 | 448 | 931 | 252 |

Thus, the solution to perform the modulation multiplication in a stage later than the first stage of the receiver reduces the complexity of the receiver when dealing with sets of DFT GCL sequences.

Further, the use of DFT sequences as modulation sequences has the advantage that these sequences result in transmission signals having very good PAR characteristics. This allows use of simple and cheap amplifiers in the transmitter of the signals as well as lower complexity in the transmitter.

The method for correlation of an input signal according to embodiments of the present invention and the receiver and communication system implementing the method make it possible to reduce the complexity involved in receiving and correlating an input signal when a set of GCL sequences based on a single Zadoff-Chu sequence are used in the system.

In an embodiment of the invention, complexity reduction is achieved, for receivers receiving signals possibly including any of a set of arbitrary modulation sequences, by separating calculations related to the set of modulation sequences from the rest of the calculations. Calculations not related to the set of modulation sequences can thereby be calculated once for all modulation sequences, instead of duplicating them for every modulation sequence. When implementing the invention in a receiver structure, this separation corresponds to performing the multiplication of received signal samples with modulation sequence elements in the last stage of the receiver. There is only one DFT or one FFT used in the receiver according to this embodiment of the invention. These features effectively reduce the complexity of the correlation.

In an embodiment of the invention, complexity reduction is achieved, for receivers receiving signals possibly including any of a set of modulation sequences defined as DFT sequences, $b_l(k)=W_m^{lk}$, l=0, 1, ..., m−1, by incorporating the multiplication of received samples with modulation sequence elements into the DFT or FFT processing. Also in this embodiment of the invention, only one DFT or one FFT is used in the receiver. These features further reduce the complexity of the correlation. Also, the use of DFT sequences as modulation sequences has the advantage of improving Peak-to-Average Ratio (PAR) for the transmitted signal. A good PAR value lowers the demands of amplifiers in the transmitters.

Correlation methods, receivers and communication systems according to the embodiments of the invention may be modified by those skilled in the art, as compared to the exemplary embodiments described above. It is, for instance, understood by a skilled person that a receiver according to the invention also may receive other types of signals than the GCL sequences described in this specification. Correlation of the input signal with a set of GCL sequences results in a reception of possible GCL sequences, whereas correlation with sequences corresponding to the other types of signals results in reception of the other type of signals.

What is claimed is:

1. A method of facilitating correlation of an input signal in a receiver, said method comprising:
   receiving the input signal, the input signal comprising a random access preamble (RAP) sequence used for uplink synchronization of a mobile terminal; and
   correlating the input signal for detection of the RAP sequence, wherein the correlating includes:
     generating a first set of samples of the input signal in a first delay line;
     processing the first set of samples in a single Discrete Fourier Transform (DFT) circuit;
     outputting a second set of samples by the DFT circuit;
     processing the second set of samples in a second delay line;
     outputting a third set of samples by the second delay line;
     performing a multiplication of the third set of samples with a matrix, wherein each row of the matrix is the complex conjugate of a modulating sequence;
     outputting a correlation output for detection of the RAP sequence.

2. The method of claim 1, wherein the correlation output is:

$$z_l(n) = \sum_{y=0}^{m-1} b_l(y) * \sum_{x=0}^{s-1} g(mx+y) \sum_{i=0}^{m-1} u(n' + smi + mx + y) f(i) W_m^{-iy},$$

where
   zl(n) is the correlation output,
   bl(y) are the modulation sequences,
   f(i) are coefficients of the first delay line,
   u(n'+smi+mx+y) is the input signal,
   g(mx+y) are coefficients of the second delay line, and
   $W_m^{-iy}$ is a factor used for DFT operation by the DFT circuit.

3. The method of claim 1, wherein the multiplication is performed in a matrix multiplier, and said correlation output is:

$$z_l(n) = \sum_{y=0}^{m-1} b_l(y) * v(y),$$

where
   zl(n) is the correlation output,
   bl(y) are the modulation sequences, and $$v(y) = \sum_{x=0}^{s-1} g(mx+y) \sum_{i=0}^{m-1} u(n' + smi + mx + y) f(i) W_m^{-iy},$$

where
   f(i) are coefficients of the first delay line,
   u(n'+smi+mx+y) is the input signal,
   g(mx+y) are coefficients of the second delay line, and
   $W_m^{-iy}$ is a factor used for DFT operation by the DFT circuit.

4. The method of claim 1, wherein the generating the first set of samples comprises:
   generating a plurality of samples by delaying the input signal;
   multiplying the plurality of samples with coefficients of the first delay line; and
   outputting the multiplied samples in parallel as the first set of samples to the DFT circuit.

5. The method of claim 1, wherein the processing the first set of samples in the DFT circuit comprises:
   receiving the first set of samples outputted from the first delay line; and
   performing an m-point DFT operation.

6. The method of claim 1, wherein the processing the second set of samples comprises:
   receiving the second set of samples outputted from the DFT circuit;
   delaying the second set of samples in a plurality of delay lines; and multiplying the delayed second set of samples with coefficients of the second delay line to generate the third set of samples.

7. The method of claim 1, wherein the performing the multiplication comprises:
receiving the third set of samples;
multiplying the third set of samples with elements of modulation sequences in a matrix multiplier circuit to generate the correlation output.

8. The method of claim 1, wherein the random access preamble sequence is derived from a Zadoff-Chu sequence.

9. The method of claim 1, wherein the input signal includes at least one GCL sequence being selected from a set of GCL sequences, the set of GCL sequences being generated by modulating a Zadoff-Chu sequence with modulating sequence.

10. A method of facilitating correlation of an input signal in a receiver, comprising:
receiving the input signal, the input signal comprising a random access preamble (RAP) sequence used for uplink synchronization of a mobile terminal; and
correlating the input signal for detection of the RAP sequence, wherein the correlating includes:
generating a first set of samples of the input signal in a first delay line;
processing the first set of samples in a single Discrete Fourier Transform (DFT) circuit;
outputting a second set of samples by the DFT circuit;
processing the second set of samples in a second delay line; and
outputting a correlation output by the second delay line for detection of the RAP sequence, wherein the processing the first set of samples in the DFT circuit includes:
receiving the first set of samples outputted from the first delay line; and
performing an m-point DFT operation, the m-point DFT operation including multiplication of the first set of samples with a matrix, wherein each row of the matrix is the complex conjugate of a modulating sequence.

11. The method of claim 10, wherein the correlation output is:

$$z_l(n) = \sum_{i=0}^{m-1} f(i) \sum_{y=0}^{m-1} W_m^{-(i+l)y} \sum_{x=0}^{s-1} u(n' + smi + mx + y)g(mx + y),$$

where
$z_l(n)$ is the correlation output,
$g(mx+y)$ are coefficients of the first delay line,
$u(n'+smi+mx+y)$ is the input signal,
$f(i)$ are coefficients of the second delay line, and
$W_m^{-(i+l)y}$ is a factor used for DFT operation by the DFT circuit.

12. The method of claim 10, wherein the generating the first set of samples comprises:
generating a plurality of samples by delaying the input signal;
multiplying the plurality of samples with coefficients of the first delay line to produce a plurality of first delay line outputs;
adding the plurality of first delay line outputs to generate the first set of samples; and
outputting the first set of samples in parallel to the DFT circuit.

13. The method of claim 10, wherein the processing the second set of samples in the second delay line comprises:
receiving the second set of samples outputted from the DFT circuit;
multiplying the second set of samples with coefficients of the second delay line;
adding the multiplied samples to generate the correlation output.

14. The method of claim 10, wherein the random access preamble sequence is derived from a Zadoff-Chu sequence.

15. The method of claim 10, wherein the input signal includes at least one GCL sequence being selected from a set of GCL sequences, the set of GCL sequences being generated by modulating a Zadoff-Chu sequence with the modulating sequences.

16. A receiver arranged to facilitate correlation of an input signal, the receiver comprising:
a first delay line circuit, configured to receive the input signal and generate a first set of samples of the input signal, the input signal comprising a random preamble (RAP) sequence used for uplink synchronization of a mobile terminal;
a single Discrete Fourier Transform (DFT) circuit, configured to process the first set of samples and output a second set of samples;
a second delay line circuit, configured to process the second set of samples, and output a third set of samples; and
a multiplication circuit, configured to perform a multiplication of the third set of samples with a matrix, wherein each row of the matrix is a complex conjugate of a modulating sequence and output a correlation output for detection of a RAP sequence.

17. The receiver of claim 16, wherein said first delay line circuit comprises:
a single delay line circuit, configured to generating a plurality of samples by delaying the input signal; and
a circuit, configured to multiply the plurality of samples with coefficients of the first delay line circuit to generate the first set of samples.

18. The receiver of claim 16, wherein said second delay line circuit comprises:
a circuit of parallel delay lines, configured to delay the second set of samples; and
a circuit, configured to multiply the delayed second set of samples with coefficients of the second delay line circuit to generate the third set of samples.

19. The receiver of claim 16, wherein the DFT circuit is a Fast Fourier Transform (FFT) circuit.

20. A receiver arranged to faciliate correlation of an input signal, the receivier comprising:
a first delay line circuit, configured to receive the input signal and generate a first set of samples of the input signal, the input signal comprising a random access preamble (RAP) sequence used for uplink synchronization of a mobile terminal;
a single Discrete Fourier Transform (DFT) circuit, configured to process the first set of samples and output a second set of samples; and
a second delay line circuit, configured to process the second set of samples, and output a correlation output for detection of the RAP sequence, wherein the DFT circuit is configured to perform an m-point DFT operation, and the m-point DFT operation includes multiplication of the first set of samples with a matrix, wherein with each row of the matrix is the complex conjugate of a modulating sequence.

21. The receiver of claim 20, wherein said first delay line circuit comprises:
   a circuit, configured to generate a plurality of samples by delaying the input signal;
   a circuit, configured to multiply the plurality of samples with coefficients of the first delay line circuit to produce a plurality of first delay line outputs; and
   a circuit, configured to add the plurality of first delay line outputs to generate the first set of samples.

22. The receiver of claim 20, wherein said second delay line circuit comprises:
   a circuit, configured to multiply the second set of samples with coefficients of the second delay line circuit; and
   a circuit, configured to add the multiplied samples to generate the correlation output.

23. A communication system, comprising: a first transceiver and a second transceiver, wherein at least one of the first and the second transceivers comprises a receiver as claimed in claim 16 or claim 20.

24. The receiver of claim 20, wherein the DFT circuit is a Fast Fourier Transform (FFT) circuit.

25. A method of facilating correlation of an input signal in a receiver, said method comprising:
   receiving the input signal; and
   correlating the input signal for detection of a random access preamble sequence (RAP), wherein the correlating includes:
      generating a first set of samples of the input signal in a first delay line;
      processing the first set of samples in a single Discrete Fourier Transform (DFT) circuit;
      outputting a second set of samples by the DFT circuit;
      processing the second set of samples in a second delay line;
      outputting a third set of samples by the second delay line;
      performing a multiplication of the third set of samples with a matrix, wherein each row of the matrix is the complex conjugate of a modulating sequence;
      outputting a correlation output for detection of the random access preamble sequence.

\* \* \* \* \*